(12) United States Patent
Gildfind

(10) Patent No.: US 9,756,400 B1
(45) Date of Patent: Sep. 5, 2017

(54) REMIXING CONTENT RECEIVED BY A SET-TOP BOX

(71) Applicant: Andrew Gildfind, Brixton (GB)

(72) Inventor: Andrew Gildfind, Brixton (GB)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/727,542

(22) Filed: Dec. 26, 2012

Related U.S. Application Data

(60) Provisional application No. 61/612,898, filed on Mar. 19, 2012.

(51) Int. Cl.
*H04N 21/81* (2011.01)
*H04N 21/4363* (2011.01)
*H04N 21/4367* (2011.01)
*H04N 21/436* (2011.01)

(52) U.S. Cl.
CPC ....... *H04N 21/812* (2013.01); *H04N 21/4367* (2013.01); *H04N 21/43607* (2013.01); *H04N 21/43615* (2013.01); *H04N 21/43622* (2013.01); *H04N 21/43637* (2013.01)

(58) Field of Classification Search
CPC ............. H04N 21/812; H04N 21/4331; H04N 21/435; H04N 21/235; H04N 21/43637; H04N 21/43607; H04N 21/43615; H04N 21/43622; H04N 21/43632; H04N 21/43635; H04N 21/4367; G06Q 30/02; H04W 12/06; H04L 63/10; H04L 63/08; G06F 21/00; G06F 21/30; G06F 21/31
USPC ..................................................... 725/32–36
See application file for complete search history.

(56) References Cited

U.S. PATENT DOCUMENTS

| | | | |
|---|---|---|---|
| 6,546,555 B1 | 4/2003 | Hjelsvold et al. | |
| 6,567,984 B1 | 5/2003 | Allport | |
| 7,725,399 B2* | 5/2010 | Nakahara et al. | 705/57 |
| 8,413,183 B2* | 4/2013 | Kunkel et al. | 725/36 |
| 2002/0162121 A1 | 10/2002 | Mitchell | |
| 2003/0159153 A1* | 8/2003 | Falvo et al. | 725/110 |
| 2003/0161610 A1* | 8/2003 | Miyazawa | H04N 7/17336 386/244 |
| 2004/0030599 A1* | 2/2004 | Sie et al. | 705/14 |
| 2004/0133909 A1* | 7/2004 | Ma | G06Q 30/0207 725/34 |
| 2005/0110909 A1* | 5/2005 | Staunton et al. | 348/734 |
| 2007/0136742 A1* | 6/2007 | Sparrell | 725/32 |
| 2007/0154169 A1 | 7/2007 | Cordray et al. | |
| 2007/0217612 A1 | 9/2007 | So | |

(Continued)

*Primary Examiner* — Benjamin R Bruckart
*Assistant Examiner* — Anthony Bantamoi
(74) *Attorney, Agent, or Firm* — Morgan, Lewis & Bockius LLP

(57) ABSTRACT

A method at a first device includes receiving a first content stream, the first content stream including a first content item and one or more first advertisements inserted in the first content item; receiving first advertisement information, where the first advertisement information is provided by an authorized source and indicates times at which the first advertisements are inserted in the first content item; generating a second content item by removing the first advertisements from the first content item in accordance with the first advertisement information; and outputting the second content item to a display.

26 Claims, 8 Drawing Sheets

(56) References Cited

U.S. PATENT DOCUMENTS

| | | | |
|---|---|---|---|
| 2009/0150553 A1* | 6/2009 | Collart | G06F 17/30017 709/229 |
| 2010/0325413 A1* | 12/2010 | Chandramouli et al. | 713/150 |
| 2011/0016498 A1* | 1/2011 | Tsuria | H04N 21/25808 725/80 |
| 2011/0281566 A1 | 11/2011 | Davis et al. | |
| 2013/0036200 A1* | 2/2013 | Roberts | H04L 65/4076 709/219 |

* cited by examiner

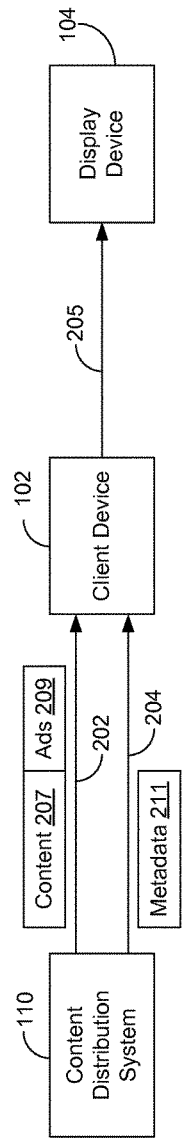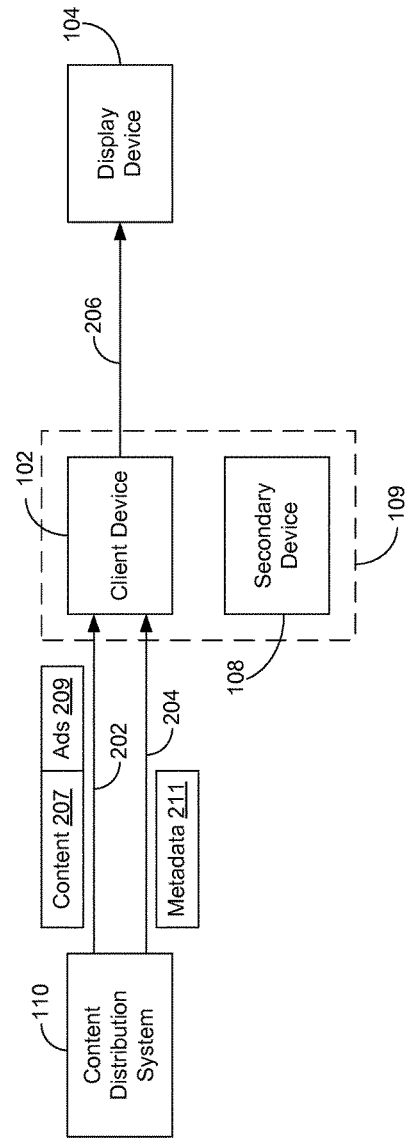

REMIXING CONTENT RECEIVED BY A SET-TOP BOX

CROSS-REFERENCE TO RELATED APPLICATIONS

This application claims priority to the following U.S. Provisional Patent Application No. 61/612,898, entitled Remixing Content Received by a Set-Top Box, filed Mar. 19, 2012, which is incorporated by reference herein in its entirety.

BACKGROUND

The disclosed implementations relate generally to content distribution.

Advertising is a major source of revenue for content distributors, such as television networks. Typically, content (e.g., a television show) distributed by a television network includes interstitial advertisements. Viewers may be annoyed by the amount of advertisements shown on television and by the fact that the advertisements often interrupt the flow of television programming, and these viewers may be receptive to ways to avoid watching advertisements (e.g., fast forwarding of programs recorded on digital video recorders, etc.). However, viewer avoidance of advertisements leads to less revenue for content distributors.

SUMMARY

Content may be delivered with advertisements to a client device, for output to a display connected to the client device. Information regarding the placement of the advertisements with the content (such as the timing of segments of the content and the advertisements) may be delivered to the client device as well. The client device can use the advertisement placement information to remove the advertisements from the content and output just the content.

According to some implementations, a method is performed at a first device. The method includes receiving a first content stream, the first content stream including a first content item and one or more first advertisements inserted in the first content item; receiving first advertisement information, where the first advertisement information is provided by an authorized source and indicates times at which the first advertisements are inserted in the first content item; generating a second content item by removing the first advertisements from the first content item in accordance with the first advertisement information; and outputting the second content item to a display.

In some implementations, the method further includes receiving one or more second advertisements; and outputting one or more of the second advertisements in conjunction with the second content item, wherein the one or more of the second advertisements are displayed in accordance with one or more pre-defined criteria.

In some implementations, the second advertisements are related to the second content item.

In some implementations, outputting the one or more of the second advertisements comprises outputting the one or more of the second advertisements during pauses or delays in outputting the second content item.

In some implementations, outputting the one or more of the second advertisements includes outputting the one or more of the second advertisements to a second device linked with the first device.

In some implementations, outputting the one or more of the second advertisements to a second device linked with the first device includes signaling the second device linked with the first device to display the one or more of the second advertisements.

In some implementations, outputting the one or more of the second advertisements includes outputting the one or more of the second advertisements alongside the second content item.

In some implementations, the received first advertisement information is encrypted.

In some implementations, the encrypted information restricts access of the advertisement information to client devices that meet one or more first conditions.

In some implementations, the first device meets the one or more first conditions.

In some implementations, the one or more first conditions are one or more of: the associated subscriber of the first device has paid for access to the first advertisement information; the first device is linked with a second device; the first device is pre-authorized to receive and decrypt the encrypted advertisement information.

In some implementations, the method further includes storing the received first content stream.

In some implementations, removing the first advertisements from the first content item in accordance with the first advertisement information includes removing the first advertisements from the first content item in the stored first content stream.

In some implementations, removing the first advertisements from the first content item in accordance with the first advertisement information includes removing the first advertisements from the first content item upon playback of the first content item.

In some implementations, outputting the second content item includes outputting the second content item on a time shift with respect to the first content stream.

In some implementations, receiving the first content stream includes receiving the first content stream in accordance with a user selection of the first content item.

In some implementations, the method further includes receiving a second content stream, the second content stream including a third content item and one or more third advertisements inserted in the third content item; receiving second advertisement information, wherein the second advertisement information indicates times at which the third advertisements are inserted in the third content item; generating a fourth content item by removing the third advertisements from the third content item in accordance with the second advertisement information; and outputting the fourth content item to a display.

In some implementations, outputting the fourth content item includes rearranging segments of the second content item with segments of the fourth content item and outputting the second and fourth content items as an rearrangement of the segments.

In some implementations, the method further includes receiving one or more fourth advertisements; and outputting one or more of the fourth advertisements in conjunction with the fourth content item, wherein the one or more of the fourth advertisements are displayed in accordance with one or more pre-defined criteria.

In some implementations, fourth advertisements are related to the fourth content item.

In some implementations, outputting the one or more of the fourth advertisements includes outputting the one or more of the fourth advertisements during pauses or delays in outputting the fourth content item.

According to some implementations, a system includes one or more processing units and memory storing one or more programs to be executed by the one or more processing units. The one or more programs include instructions for receiving a first content stream, the first content stream including a first content item and one or more first advertisements inserted in the first content item; receiving first advertisement information, where the first advertisement information is provided by an authorized source and indicates times at which the first advertisements are inserted in the first content item; generating a second content item by removing the first advertisements from the first content item in accordance with the first advertisement information; and outputting the second content item to a display.

In some implementations, the system further includes instructions for performing any of the above described methods.

According to some implementations, a non-transitory computer readable storage medium stores one or more programs configured for execution by a computer. The one or more programs include instructions for receiving a first content stream, the first content stream including a first content item and one or more first advertisements inserted in the first content item; receiving first advertisement information, where the first advertisement information is provided by an authorized source and indicates times at which the first advertisements are inserted in the first content item; generating a second content item by removing the first advertisements from the first content item in accordance with the first advertisement information; and outputting the second content item to a display.

In some implementations, the non-transitory computer readable storage medium further includes instructions for performing any of the above described methods.

BRIEF DESCRIPTION OF THE DRAWINGS

FIGS. 2A-2B are block diagrams illustrating distribution of content from a content distribution system to a client device, according to some implementations.

DETAILED DESCRIPTION

A content and advertisement distribution method and system is described. A content distribution system distributes content, including advertisements, to a client device (e.g., a set-top box). The content distribution system also distributes information regarding the placement or insertion of advertisements in the content to the client device. When specified conditions are satisfied (e.g., the client device is linked with an authorized secondary device), the client device, using the advertisement placement information, removes the advertisements from the content. Alternative advertisements are displayed elsewhere (e.g., on the secondary device) to compensate for the removed advertisements. The alternative advertisements may be the advertisements removed from the content or other advertisements. Other content authorized by the advertisers or content providers may also be displayed on the secondary device.

Figure 1:
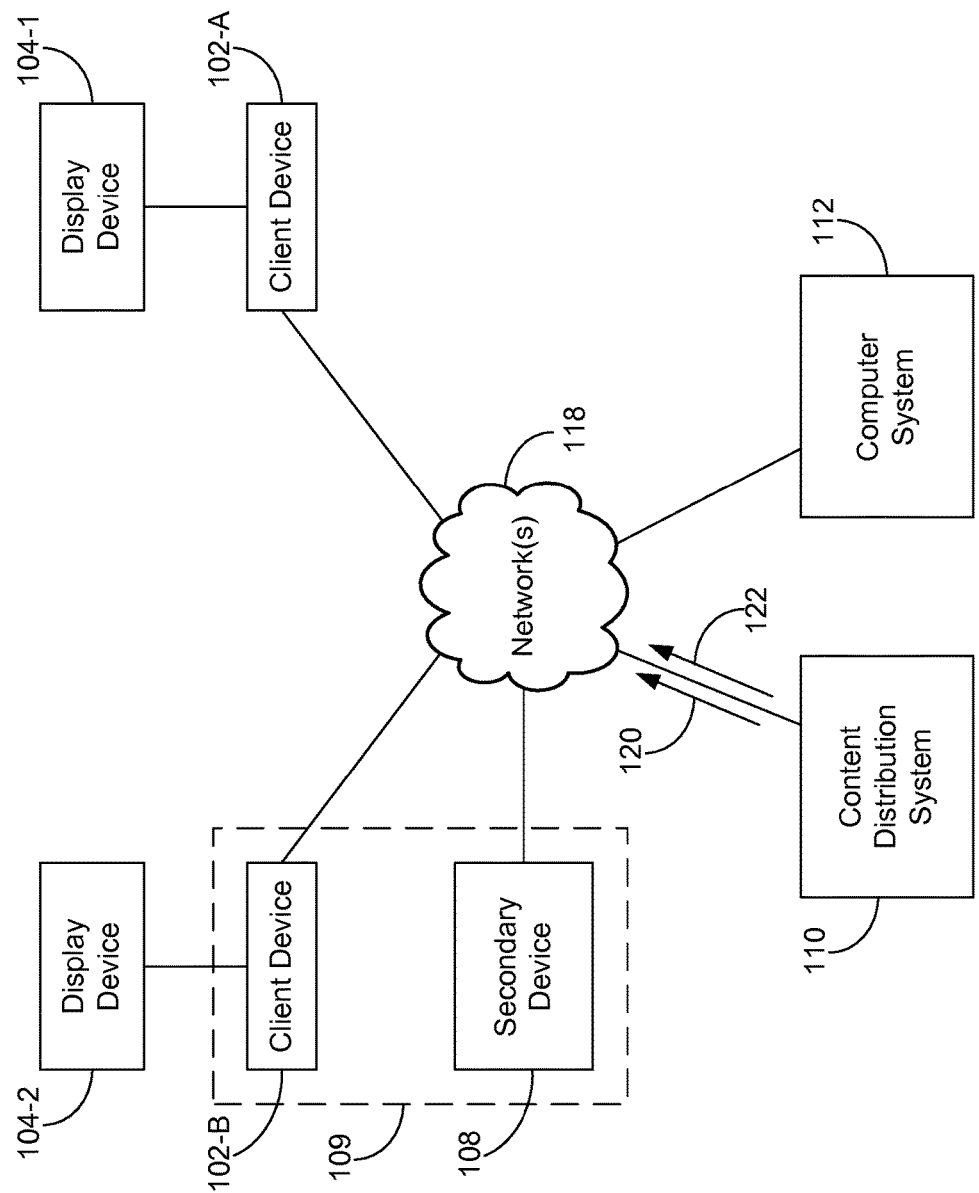
FIG. 1 is a block diagram illustrating a content distribution environment, according to some implementations.

FIG. 1 is a block diagram illustrating a content distribution environment, according to some implementations. The content distribution environment 100 includes one or more client devices 102. A respective client device 102 is coupled to a respective display device 104. Client devices 102 are communicatively coupled to a content distribution system 110 and a computer system 112 by one or more communications networks 118 (e.g., the Internet). In some implementations, client devices 102 may be set-top boxes. As used in this specification, a set-top box (STB) is a device that is configured to receive one or more external signals and to output content that is carried in the signals. In some implementations, a STB is a conventional, dedicated set-top box; a hybrid device, such as a digital video recorder (DVR) with set-top box capabilities as described herein; a personal computer with set-top box capabilities; an internet-connected media streaming device with set-top box capabilities; or a game console with set-top box capabilities. The signals may be broadcast signals, signals carried over a cable television system or satellite television system, or data packets, for example.

A respective client device 102 receives signals containing one or more streams 120 of content (e.g., television programming, video, audio, etc.) from the content distribution system 110, processes the received signals (e.g., decrypting and/or decoding the signal(s)) to access a respective content stream 120, and outputs the content in the respective content stream to a coupled display device 104. For example, the client device 102-A outputs content to the display device 104-1, and the client device 102-B outputs content to the display device 104-2. The client device 102 also receives advertisement information 122 from the content distribution system 110. In some implementations, the display device 104 may be a computer monitor or a television. In some implementations, the content distribution system 110 may be one or more of a cable, satellite, broadcast, and/or Internet Protocol content distribution system. In some implementations, a client device 102 and a display device 104 may be combined into a single device (e.g., a television integrating the functionality of a set top box, or a mobile device operative to process and output signals received from content distribution system 110).

In some implementations, the content stream(s) 120 may be transmitted continuously from the content distribution system 110, with the content included in a respective stream differing based on the time of day (e.g., different television programs on a channel throughout the day).

In some implementations, one or more of the content streams 120, as well as the advertisement information 122, may be access-restricted or otherwise protected from unauthorized access (e.g., to prevent theft of services, to condition access on satisfaction of specific criteria or conditions). The protection or access restriction measures applied to the content streams and/or advertisement information may be applied by the content distribution system 110. Measures that may be used to protect or restrict access to a content stream 120 or advertisement information 122 include, for example, encrypting a stream and requiring that the client device 102 decrypt the stream in order to access the content. In some implementations, a decryption key or other access code is provided to the client device 102 upon satisfaction of specific criteria or conditions. For example, in some implementations, the decryption key is only provided to devices authorized by content providers to receive it. In some other implementations, the decryption key is provided to the client device 102 regardless of whether the conditions or criteria are satisfied, but the client device 102 is configured to not perform the decryption using the key unless the conditions or criteria are satisfied. In still other implementations, the client device 102 may provide user authentication information (e.g., a username and password combination) prior to being authorized to access the content stream 120 and/or the advertisement information 122.

In some implementations, the signals received from the content distribution system 110 include content streams 120 corresponding to respective channels. The client device 102 tunes to a particular channel in the signals to receive the content stream corresponding to the tuned channel, and accordingly, whatever content that may be carried on the tuned channel. The client device 102 may tune to any particular channel in the signals in accordance with end user commands (e.g., an end user changes channels using a remote control) or pre-programmed instructions (e.g., an end user sets the client device 102 to tune to a channel at a particular time interval in order to record the content in that channel at that particular time interval).

An authorized secondary device 108 may be linked with a respective client device 102. For example, the client device 102-B is linked with the secondary device 108, with the linking status represented by a dotted-line box 109, and the client device 102-A is not linked with a secondary device. The secondary device 108 is a device that is distinct from the client device 102 and has a display (either integrated with or otherwise coupled to the secondary device 108) distinct from the display device 104. In some implementations, the secondary device 108 may be referred to as a second-screen device that is used by the user at the same time content is being displayed on the display device 104. In some implementations, the secondary device 108 may be a desktop computer, a laptop computer, a smartphone, a tablet computer or device, a portable media player device, or a portable video game player device. A secondary device 108 may be linked with a client device 102 directly (e.g., by a wired (e.g., Universal Serial Bus (USB)) or wireless (e.g., Bluetooth, ad hoc Wi-Fi, Wi-Fi tethering) connection to the client device 102) or indirectly (e.g., the secondary device 108 and the client device 102 communicate with each other through an intermediary, such as a computer system 112).

As used in this specification, an authorized secondary device 108 is linked with a client device 102 (and vice versa) when the secondary device 108 and the client device 102 each acknowledges the presence and activity of the other device, and the secondary device 108 is authorized to display advertising content. The client device 102 and the secondary device 108 may acknowledge each other by use of a handshake or other negotiation process. Depending on the implementation, the handshake or negotiation process may be performed through a direct (wired or wireless) connection or though an intermediary (e.g., a computer system 112). When the secondary device 108 and the client device 102 are linked through an intermediary, the intermediary may be said to link one device with the other device.

In implementations where the handshake process is performed through an intermediary (e.g., the computer system 112), the handshake process may proceed as follows: an end user logs into the computer system 112, from the secondary device 108, on an account with which the client device 102 is associated. The computer system 112 detects the secondary device 108 and sends signals to the client device 102 informing the client device 102 of the presence of the secondary device 108. The client device 102 sends acknowledgement signals to the computer system 112, which relays the acknowledgement signals to the secondary device 108. The secondary device 108 sends acknowledgement signals to the computer systems 112, which relays them to the client device 102. With the client device 102 and the secondary device 108 acknowledging each other's presence, the devices are linked. The client device 102 and the secondary device 108 may periodically send signals to each other, through computer system 112, to verify that the other device is still present and active.

In some implementations, the process of linking a secondary device 108 with a client device 102 and authorizing the secondary device 108 may include a user of the secondary device 108 logging in with credentials (e.g., username and password) at the secondary device 108. The credentials that authorize the secondary device 108 are credentials associated with the content subscriber with which the client device 102 is associated. For example, a cable subscriber can log in at the secondary device 108 with credentials that are associated with their cable subscription. If the secondary device 108 is linking directly with the client device 102, the client device 102 may verify the submitted credentials with the content distribution system 110 (e.g., by verifying the credentials against subscriber data 626 (FIG. 6)). If the secondary device 108 is linking with the client device 102 through computer system 112, the computer system may verify the submitted credentials with the content distribution system 110.

A content distribution system 110 distributes content (e.g., television programming) to client devices 102 through the network(s) 118. In some implementations, the network(s) 118 include one or more of fiber optic cable networks, coaxial cable networks, satellite networks, copper-wire based networks (e.g., digital subscriber line (DSL), phone line, WAN, LAN, the Internet, etc.), wireless networks (e.g., Wi-Fi, broadcast), or any mix or combination of the above. In some implementations, the content distribution system 110 is a cable television system, satellite television system, broadcast television system, a system that delivers television programming through fiber optic networks, an Internet Protocol television (IPTV) system, an online video streaming system, a system for downloading portions or an entire media item, or any other type of content distribution system. In some implementations, the content distribution system 110 includes one or more computing devices (e.g., servers).

In some implementations, client devices 102 may be coupled to the networks 118 using multiple connections. For example, a client device 102 may connect to the networks 118 using a satellite connection and an Ethernet connection. The satellite connection may be used to receive content signals from the content distribution system 110, and the Ethernet connection may be used to transmit and receive other data (e.g., diagnostic information, billing information, etc.) to/from content distribution system 110 and/or computer system 112.

One or more computer systems 112 are communicatively coupled to the client devices 102, the secondary device 108, and the content distribution system 110. A computer system 112 includes one or more computing devices (e.g., server computers).

In some implementations, a computer system 112 may be configured to be an intermediary for linking client devices 102 with secondary devices 108. The computer system 112 may include a database that includes user accounts and information associating the user accounts with respective client devices 102. Alternatively, the information regarding user accounts and associated client devices 102 may be stored at the content distribution system 110 and the computer system 112 can retrieve such information from the content distribution system 110.

In some implementations, a computer system 112 may distribute advertisements to secondary devices 108. In some implementations, the computer system 112 determines which advertisements to distribute to a secondary device 108 based on predefined criteria (e.g., the demographics of the user of the secondary device 108, the content being output by the client device 102 to which the secondary device 108 is linked, metadata associated with the content, etc.).

In some implementations, the computer systems 112 may include a respective system configured to be an intermediary for linking client devices 102 with secondary devices 108, as described above, and a respective system configured to distribute advertisements to secondary devices 108, as described above.

FIGS. 2A-2B are block diagrams illustrating distribution of content from a content distribution system 110 to a client device 102, according to some implementations. For brevity, in FIGS. 2A-2B the network(s) 118 communicatively coupling the content distribution system 110 and the client device 102 are omitted.

The content distribution system 110 may distribute content to one or more client devices 102 (through network(s) 118). The content (e.g., a television program) may be included in a content stream 202. The content stream 202 (e.g., content stream 120, FIG. 1) may include the content 207 and one or more advertisements 209. In some implementations, the advertisements 209 include interstitial advertisements. For example, the content 207 may include one or more television programs, including the commercial breaks between segments of the television program(s) and the advertisements 209 (e.g., the commercials) that are placed in or inserted into the commercial breaks.

The content distribution system 110 may also transmit advertisement information 204 (e.g., advertisement information 122) to the client device 102. The advertisement information 204 may include information regarding when and where the advertisements 209 in the content stream 202 are placed or inserted with respect to the content, and in some implementations, unique identifiers for the advertisements 209. For example, if the content 207 includes a television program broadcast with commercial breaks, the advertisement information 204 may include information that indicates the timing of the advertisements 209 with respect to the television program (e.g., start and end times of the commercial breaks, start and end times of respective advertisements, time lengths of respective advertisements, etc.). In some implementations, the advertisement information 204 for the advertisements 209 on a particular channel is transmitted to the client device 102 when the client device 102 is tuned to the particular channel. In some implementations, the advertisement information 204 is provided to the content distribution system 110 by an authorized party or source (e.g., the content producer, the broadcaster, an authorized content distributor).

In some implementations, the advertisement information 204 is transmitted continuously (e.g., in a data stream) by the content distribution system 110. The advertisement information 204 may be transmitted in a separate stream from the content stream 202, or the two may be multiplexed together in one stream. The contents of the advertisement information 204 may be synchronized with the content 207 in the content stream 202.

In some implementations, the advertisement information 204 may also include other metadata 211 pertaining to the respective advertisements 209. For example, the metadata 211 may include keywords and other information indicating the subject matter of the advertisements 209, identities of the advertisers associated with the advertisements 209, and so on.

The client device 102 may receive the content stream 202 and the advertisement information 204 from the content distribution system 110. The content stream 202 (or at least a portion of the content stream 202) may be stored by the client device 102. In some implementations, storing the content stream 202 includes buffering the content stream 202 as it is received and/or storing the content stream 202 in non-volatile memory (as in a digital video recorder (DVR) recording a television program and accompanying advertisements). In some implementations, the length (amount) of buffer needed depends on the length of the content item (e.g., the program being streamed). For example, for an hour-long program, the buffer may be about 16-18 minutes long. The advertisement information may also stored by the client device 102.

The client device 102 can output the content included in the content stream 202 to a display device 104 for display. By default, the client device 102 outputs a content output 205 to the display device 104, as shown in FIG. 2A. The content output 205 includes the content 207 and the advertisements 209 that were included in the content stream 202.

If one or more specific conditions are satisfied (e.g., an authorized secondary device 108 being linked with the client device 102), the client device 102 can instead output a rearranged content output 206 to the display device 104. The rearranged content output 206 includes a rearrangement of the content 207 that was included in the content stream 202 stored at the client device 102. In some implementations, the rearrangement includes removing the advertisements 209 (e.g., removing from a television program the commercial breaks and the advertisements in the commercial breaks, and then concatenating the segments of the program together). In some other implementations, the rearrangement includes moving the advertisements 209 to different times relative to the content 209. In some further implementations, the rearrangement include removing the advertisements 209 and inserting other content (e.g., different advertisements, other approved content (e.g., content approved by the broadcaster or content provider). The client device 102, using the advertisement information 204, identifies the advertisements in the content stream 202, and by extension, the content segments, and generates the rearranged content output 206 from the content segments.

In some implementations, the rearrangement includes rearranging or remixing multiple pieces of content (e.g., multiple television programs) from one or more stored content streams as well as removing the advertisements. For example, segments from multiple television programs (from one or more stored content streams) may be concatenated together (e.g., the segments are concatenated such that the television programs run back-to-back, the segments are concatenated such that a segment from one program is followed by a segment from another program). As another example, segments from the multiple television programs may be "spliced" together (e.g., the first segment for a first program, followed by the first segment for a second program, and so on).

In some implementations, the rearranged content output 206 may be output on a time shift with respect to the "live" content stream 202. The "live" content stream 202 may be stored or buffered by the client device 102 and the stored/buffered content stream may be rearranged to generate the rearranged content output 206. The storing/buffering of the stream 202 and the generating of the output 206 may lead to some amount of delay between the "live" stream 202 and the output 206. Thus, with respect to timing, content output 205 is analogous to a live broadcast of a program at its scheduled time, and the rearranged content output 206 is analogous to a viewing of a recording of the program after live, scheduled time of the program. In some implementations, the advertisements 209 may be removed upon playback of the stored or buffered content stream 202.

In some implementations, the content stream 202 may be selected in advance by an end user. For example, the user may select one or more programs for later viewing from an interactive program guide. The content stream(s) 202 containing these selected programs, along with the corresponding advertisement information 204, are received by the client device 102 and stored at the client device 102. The advertisements may be removed from the content in the stored content stream(s) 202 in accordance with the advertisement information 204, and the resulting rearranged content output 206 is output to a display 104.

In some implementations, the advertisement information 204 may be access-restricted or otherwise protected, so that it is not able to be processed properly unless the condition(s) or criterion or criteria (e.g., a requirement that the secondary device 108 is logged into the client device 102) are satisfied. In some cases, the advertisement information 204 may be encrypted, and the client device 102 is enabled to decrypt the advertisement information 204 when the condition(s) or criterion or criteria are satisfied. For example, the client device 102 may be provided a decryption key when the condition(s) or criterion or criteria are satisfied. As another example, the client device 102 may be provided a decryption key regardless of whether the condition(s) or criterion or criteria are satisfied, but a decryption process in the client device 102 that utilizes the decryption key is activated when the condition(s) or criterion or criteria are satisfied. In some implementations, the client device 102 is specifically authorized by the content distribution system 110 to receive the decryption key.

In some implementations, the condition(s) or criterion for the client device 102 to output the rearranged content output 206 may include the client device 102 being linked with an authorized secondary device 108 (e.g., the client device 102 linked 109 to a secondary device 108, FIG. 2B) and/or a subscriber associated with the client device 102 subscribing to access to the advertisement information 204 (i.e., paying extra to have advertisements removed from the content). When the client device 102 is linked with the authorized secondary device 108, the secondary device 108 may be referred to as "logged into" the client device 102. The client device 102 and the authorized secondary device 108 may be linked directly (e.g., through direct (wired or wireless) communication between the client device 102 and the secondary device 108) or indirectly through an intermediary (e.g., through computer system 112).

In some implementations, one or more advertisements may be displayed on the display 104. The advertisements may be received by the client device 102 from, for example, the content distribution system 110 and/or the computer system 112. The client device 102 may output the advertisements to display 104 for display and/or transmit the advertisements to the linked secondary device 108 for display on a display coupled to the secondary device 108. Advertisements output to display 104 may be displayed when content is not being actively viewed (e.g., content is paused) or during a delay when the content stream is being buffered. Advertisements may be displayed on a linked secondary device 108, in accordance with predefined criteria, such as user preferences and other advertisement placement criteria, while rearranged content output 206 is being output to display 104.

In some implementations, when the client device 102 is linked with the authorized secondary device 108, one or more advertisements may be displayed on a secondary device 108. The advertisements displayed on the secondary device 108 may be transmitted from the computer system 112 or the content distribution system 110, directly to the secondary device 108 or through the client device 102. In some implementations, the advertisements displayed on the secondary device 108 can include one or more of the advertisements 209; one or more of the advertisements 209 are displayed on the secondary device 108 instead of display 104. In some implementations, the advertisements displayed on the secondary device 108 can include one or more advertisements that are determined to be related to and/or contextual respect to the content 207 and/or the end user. The determination of which advertisements are related may be made by the computer system 112 or the client device 102. The determination may be made based on metadata associated with the content or characteristics of the end user (e.g., subscriber) associated with the client device 102.

In some implementations, when the secondary device 108 is logged into the client device 102, the secondary device 108 is configured to be a remote control for the client device 102. Thus, for example, when the secondary device 108 is linked with the client device 102, an end user may input commands (e.g., change channels, activate digital recording capabilities, etc.) to the client device using the secondary device 108.

In some implementations, activity and/or proximity of the secondary device 108 may be verified periodically or in response to predefined events. Example methods of verification of activity/proximity of the secondary device 108 include periodic log-ins on the secondary device 108, log-ins when the client device 102 or the display device 104 is powered on, detecting activation of remote-control functions to control the client device 102, motion sensors, spatially-limited communications (e.g., Bluetooth, infrared), and audio finger printing (e.g., using a microphone, if any, on the secondary device 108, to pick up surrounding sounds and verifying that the picked-up sounds includes audio from content output by the client device 102 (e.g., audio from a television program).

Figure 3:
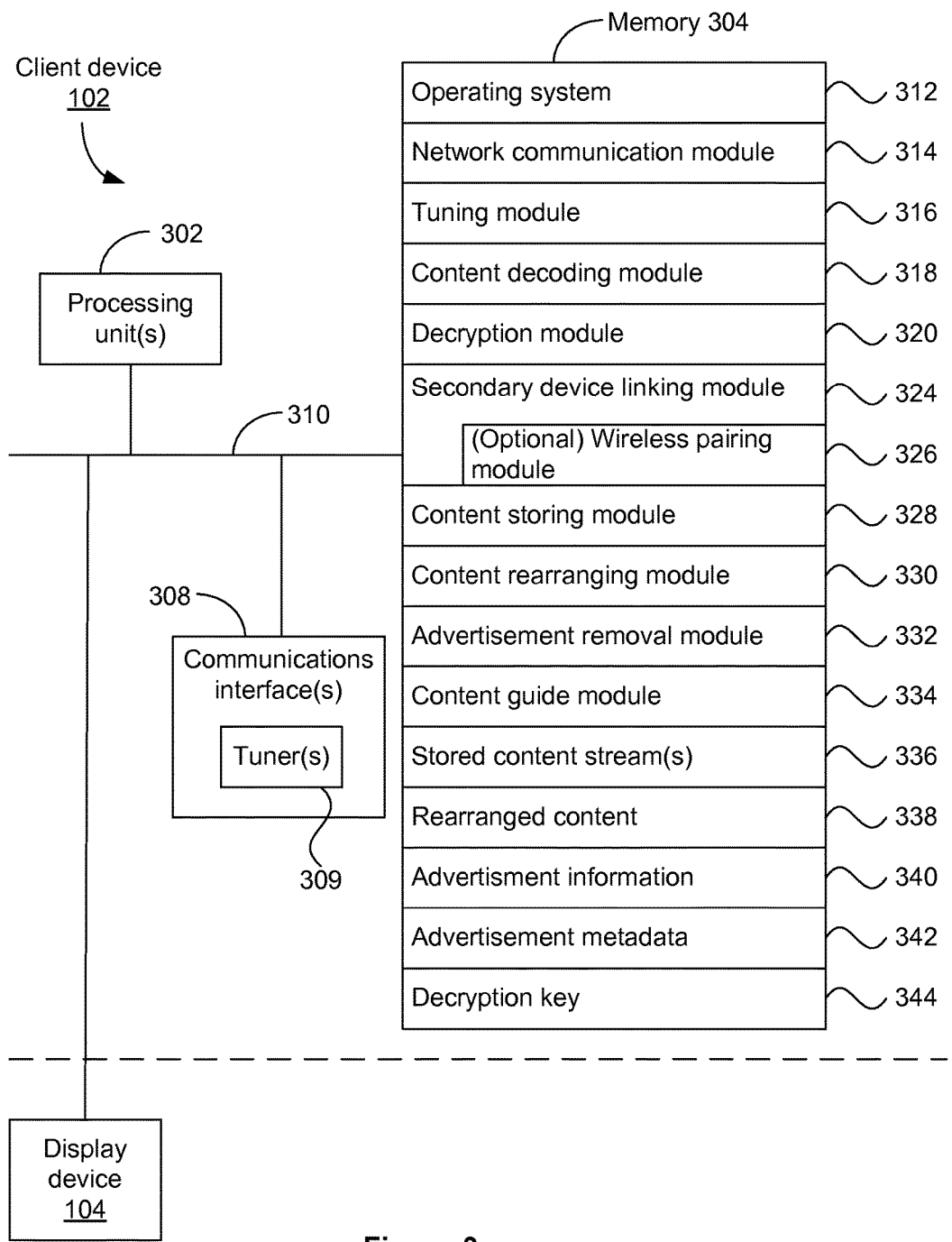
FIG. 3 is a block diagram illustrating a client device, according to some implementations.

FIG. 3 is block diagram illustrating a client device, according to some implementations. In FIG. 3, a client device 102 typically includes one or more processing units (CPU's) 302, one or more network or other communications interfaces 308, memory 304, and one or more communication buses 310 for interconnecting these components. In some implementations, the communications interfaces 308 includes one or more tuners 309 for tuning to channels in content signals transmitted from content distribution system 110. Client device 102 may be coupled to a display device 104.

Figure 5:
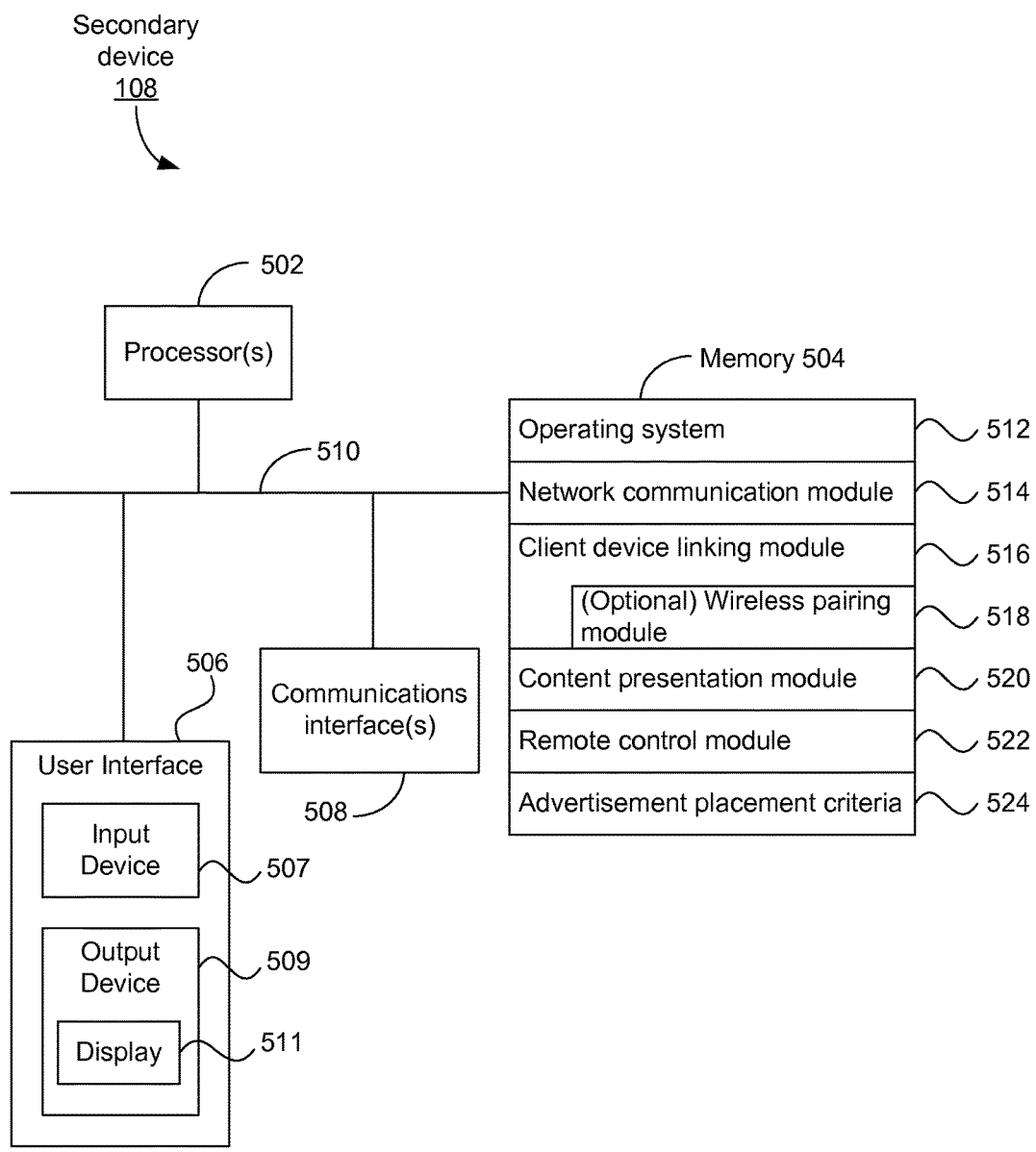
FIG. 5 is a block diagram illustrating a secondary device, according to some implementations.
Figure 6:
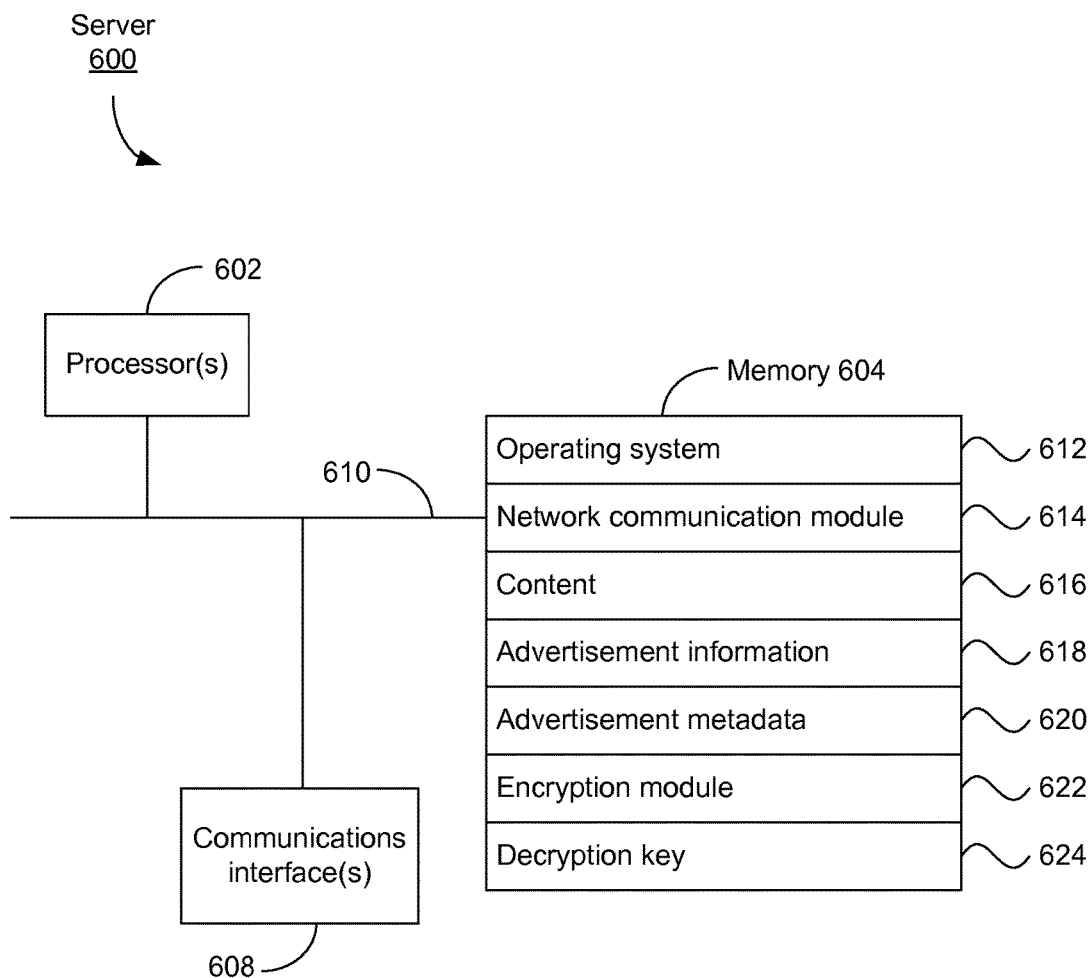
FIG. 6 is a block diagram of a server in a content distribution system, according to some implementations.

Memory 304 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 304 may optionally include one or more storage devices remotely located from the processing unit(s) 302. Memory 304, or alternately the non-volatile memory device(s) within memory 304, comprises a non-transitory computer readable storage medium. In some implementations, memory 304 or the computer readable storage medium of memory 304 stores the following programs, modules and data structures, or a subset thereof:

- an operating system 312 that includes procedures for handling various basic system services and for performing hardware dependent tasks;
- a network communication module 314 that is used for connecting the client device 102 to other computers or systems (e.g., content distribution system 110, computer system 112) via the one or more communication network interfaces 308 (wired or wireless) and one or more communication networks, such as the Internet, other wide area networks, local area networks, metropolitan area networks, cable televisions systems, satellite television systems, IPTV systems, and so on;
- a tuning module 316 for tuning to channels in signals received from the content distribution system 110;
- a content decoding module 318 for decoding content streams and outputting the content in the decoded streams to the display device 104;
- a decrypting module 320 for decrypting an encrypted content stream;
- a secondary device linking module 324 for linking a secondary device (e.g., secondary device 108, FIG. 5) with the client device 102;
- a content storing module 328 for storing content streams received from a content distribution system 110;
- a content rearranging module 330 for generating rearranged content 338;
- advertisement removal module 332 for removing advertisements from content in stored content 336;
- content guide module 334 for presenting to end users listings and schedules of available content and for receiving user inputs selecting content;
- stored content stream(s) 336, which are content streams received from the content distribution system 110 and stored in the memory 304;
- rearranged content 338, which is content generated by rearranging content contained in the stored content stream(s) 336;
- advertisement information 340 received from content distribution system 110, corresponding to advertisement information 618 (FIG. 6);
- advertisement metadata 342 received from content distribution system 110, corresponding to advertisement metadata 620 (FIG. 6); and
- decryption key 344 received from content distribution system 110, corresponding to decryption key 624 (FIG. 6).

The secondary device linking module 324 may optionally include a wireless linking module 326 for linking with a secondary device 108 through a direct wireless connection.

Figure 4:
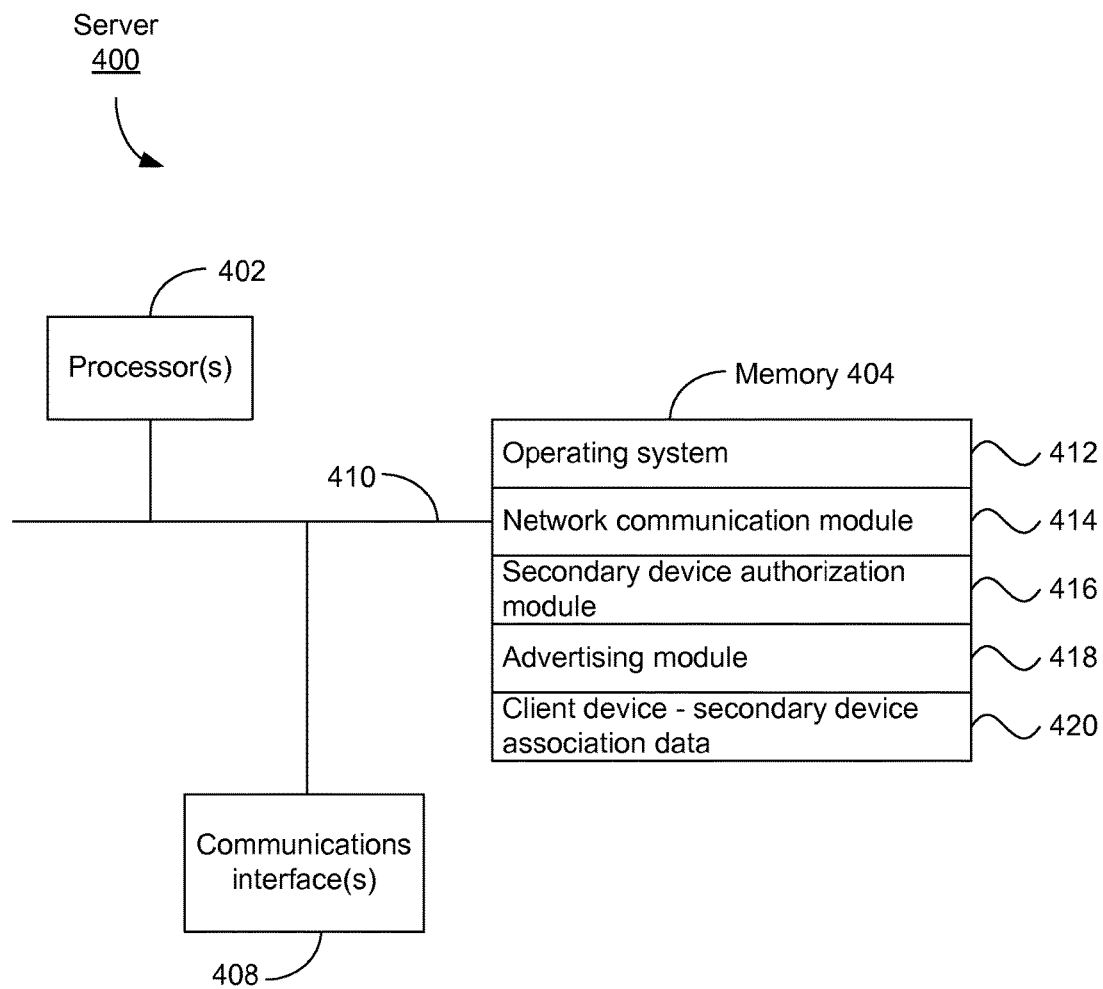
FIG. 4 is a block diagram illustrating a server in a computer system, according to some implementations.

FIG. 4 is a block diagram illustrating a computing device (e.g., a server) in a computer system 112, according to some implementations. The server 400 typically includes one or more processing units (CPU's) 402, one or more network or other communications interfaces 408, memory 404, and one or more communication buses 410 for interconnecting these components.

Memory 404 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 404 may optionally include one or more storage devices remotely located from the CPU(s) 402. Memory 404, or alternately the non-volatile memory device(s) within memory 404, comprises a non-transitory computer readable storage medium. In some implementations, memory 404 or the computer readable storage medium of memory 404 stores the following programs, modules and data structures, or a subset thereof:

- an operating system 412 that includes procedures for handling various basic system services and for performing hardware dependent tasks;
- a network communication module 414 that is used for connecting the server 400 to other computers or systems (e.g., content distribution system 110; client devices 102, secondary devices 108) via the one or more communication network interfaces 408 (wired or wireless) and one or more communication networks, such as the Internet, other wide area networks, local area networks, metropolitan area networks, cable televisions systems, satellite television systems, IPTV systems, and so on;
- a secondary device authorization module 416 for authenticating and authorizing secondary devices 108 logging onto the computer system 112;
- an advertising module 418 for providing advertisements to client devices 102; and
- client device—secondary device association data 420 that maps client devices to secondary devices for linking purposes.

In some implementations, the advertising module 418 determines which advertisements are related to the content being output by a client device 102 and/or the end user or subscriber associated with the client device 102, and provides the advertisements determined to be relevant to the client device 102.

FIG. 5 is block diagram illustrating a secondary device, according to some implementations. In FIG. 5, a secondary device 108 typically includes one or more processing units (CPU's) 502, one or more network or other communications interfaces 508, memory 504, and one or more communication buses 510 for interconnecting these components. The secondary device 108 also includes user interface devices 506. User interface devices 506 may include one or more input devices 507 (e.g., keyboard, mouse, touch-sensitive surface, physical buttons, etc.) and one or more output devices 509. The output devices 509 include a display device 511 and optionally other output devices (e.g., audio speakers, headphones). In some implementations, the secondary device 108 includes a touch-sensitive display (also called a touch screen), which includes a touch-sensitive surface and a display device.

Memory 504 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 504 may optionally include one or more storage devices remotely located from the processing unit(s) 502. Memory 504, or alternately the non-volatile memory device(s) within memory 504, comprises a non-transitory computer readable storage medium. In some implementations, memory 504 or the computer readable storage medium of memory 504 stores the following programs, modules and data structures, or a subset thereof:

- an operating system 512 that includes procedures for handling various basic system services and for performing hardware dependent tasks;
- a network communication module 514 that is used for connecting the secondary device 108 to other computers or systems (e.g., content distribution system 110, computer system 112) via the one or more communication network interfaces 508 (wired or wireless) and one or more communication networks, such as the Internet, other wide area networks, local area networks, metropolitan area networks, cable televisions systems, satellite television systems, IPTV systems, and so on;
- a client device linking module 516 for linking a client device (e.g., client device 102, FIG. 3) with the secondary device 108;
- a content presentation module 520 for presenting content on output devices 509;
- a remote control module 522 for controlling a linked client device 102 in accordance with user inputs; and
- advertisement placement criteria 524.

The client device linking module 516 may optionally include a wireless linking module 518 for linking with a client device 102 through a direct wireless connection.

In some implementations, the content presentation module 520 is a web browser application, a media (e.g., video) player application, or a combination thereof. The content presented by the content presentation module 520 may include advertisements.

In some implementations, the advertisement placement criteria 524 are specified criteria for the placing and display of advertisements on secondary device 108 and/or on display 104. The advertisement placement criteria 524 may include predefined defaults, user-set preferences, etc.

FIG. 6 is a block diagram illustrating a computing device (e.g., a server) in a content distribution system 110, according to some implementations. The server 600 typically includes one or more processing units (CPU's) 602, one or more network or other communications interfaces 608, memory 604, and one or more communication buses 610 for interconnecting these components.

Memory 604 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 604 may optionally include one or more storage devices remotely located from the CPU(s) 602. Memory 604, or alternately the non-volatile memory device(s) within memory 604, comprises a non-transitory computer readable storage medium. In some implementations, memory 604 or the computer readable storage medium of memory 604 stores the following programs, modules and data structures, or a subset thereof:

- an operating system 612 that includes procedures for handling various basic system services and for performing hardware dependent tasks;
- a network communication module 614 that is used for connecting the server 600 to other computers or systems (e.g., the content distribution system 110; client devices 102, secondary devices 108) via the one or more communication network interfaces 608 (wired or wireless) and one or more communication networks, such as the Internet, other wide area networks, local area networks, metropolitan area networks, cable televisions systems, satellite television systems, IPTV systems, and so on;
- content 616 (e.g., television programming) that may be distributed to client devices 102 in content streams;
- advertisement information 618 that specifies where the advertisements are time-wise with respect to the content 616;
- metadata 620 that specifies information about the advertisements contained in content 616;
- an encryption module 622 for encrypting advertisement information 618 prior to distribution to client devices 102; and
- a decryption key 624 that may be sent to a client device 102 and used by the client device 102 to decrypt encrypted advertisement information 618.

Content 616 may include advertisements 618. The advertisements 618 may include interstitial advertisements that are inserted between portions of the content (e.g., between segments of a television program).

Advertisement metadata 620 specifies information about the advertisements contained in the content 618. The metadata 620 may include one or more of: information identifying an advertiser associated with a respective advertisement, information identifying a subject matter of a respective advertisement, a reference identifier for a respective advertisement, or a duration of a respective advertisement.

FIGS. 3-6 are intended more as functional descriptions of the various features which may be present in a set of devices or computer systems than as a structural schematic of the implementations described herein. In practice, and as recognized by those of ordinary skill in the art, items or components shown separately could be combined and some items could be separated. For example, some items shown separately in these figures could be implemented on single servers and single items could be implemented by one or more servers. Some items or components shown may be omitted, and items or components that are not shown may be added. The actual number of systems used to implement determination of viewership metrics and how features are allocated among them will vary from one implementation to another.

Figure 7A:
FIGS. 7A-7B are flow diagrams illustrating a process of distributing content in accordance with some implementations.
Figure 7B:
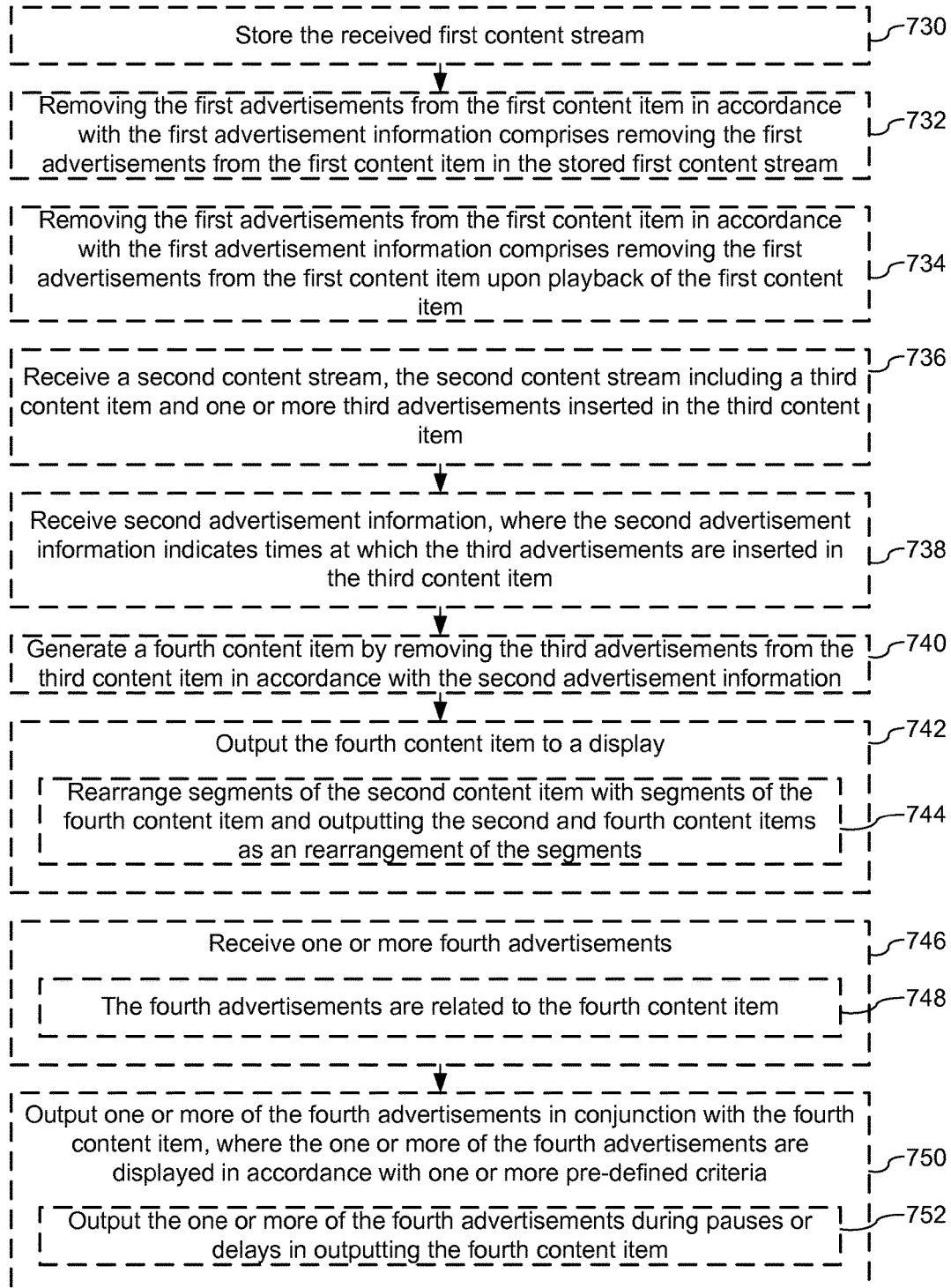

FIGS. 7A-7B are flow diagrams illustrating a process 700 for distributing content, according to some implementations. Each of the operations shown in FIGS. 7A-7B may correspond to instructions stored in a computer memory or computer readable storage medium. In some implementations, the process 700 may be implemented at a first device (e.g., client device 102). The first device may be coupled to a display (e.g., display 104).

The first device receives (702) a first content stream, the first content stream including a first content item and one or more first advertisements inserted in the first content item. A client device 102, for example, may receive a content stream 202 from a content distribution system 110. The content stream 202 includes a content item (e.g., a television program) and one or more advertisements. The advertisements may be interstitial with respect to the content item.

In some implementations, the first device receives (704) the first content stream in accordance with a user selection of the first content item. An end user may select the first content item for viewing (e.g., using content guide module 334, FIG. 3). In response to the selection, the client device 102 tunes to the channel having the first content stream and receives the first content stream.

In some implementations, the first device stores (730) the received first content stream. The client device 102 stores or buffers the content stream 202 for later processing to remove the first advertisements from the content item in the content stream 202.

The first device receives (706) first advertisement information, where the first advertisement information is provided by an authorized source and indicates times at which the first advertisements are inserted in the first content item. The client device 102 receives advertisement information 204 for the advertisements included in the content stream 202. The advertisement information 204 indicates the times when the advertisements in the content stream 202 are inserted with respect to the content item in the content stream 202. The advertisement information 204 may be provided by an authorized party or source.

In some implementations, the received first advertisement information is encrypted (708). For example, the advertisement information 204 may be encrypted. The encryption restricts access to the advertisement information 204 to those client devices 102 that meet specific conditions (e.g., the associated subscriber has paid for access to the advertisement information 204, client device 102 is linked with a secondary device 108, the client device 102 is pre-authorized to receive and decrypted the encrypted advertisement information 204, etc.).

The first device generates (710) a second content item by removing the first advertisements from the first content item in accordance with the first advertisement information. The client device 102 removes the advertisements from the first content item in the content stream 202, generating a second content item without the advertisements as a result. The client device 102 uses the advertisement information 204 to identify the advertisements for removal. The generation of the second content item may include taking the segments of the content item that are not advertisements and either concatenating the segments or inserting other content (e.g., segments of other content items) in the between segments.

The first device outputs (712) the second content item to a display. The client device 102 outputs the second content item as rearranged content output 206 to a display device 104. The rearranged content output 206 is displayed on display 104.

In some implementations, outputting the second content item includes outputting the second content item on a time shift with respect to the first content stream (714). The client device 102 may output the rearranged content output 206 on a time shift with respect to the content stream 202; the rearranged content output 206 is on a delay with respect to the live content stream 202. In some implementations, the time shift accounts for a delay required for the client device 102 to store or buffer the content stream 202 and to remove the advertisements from the stored/buffered content stream 202 to generate the rearranged content output 206.

In some implementations, the first device receives (716) one or more second advertisements. The client device 102 may receive one or more second advertisements from the computer system 112.

The first device outputs (720) one or more of the second advertisements in conjunction with the second content item, where the one or more of the second advertisements are displayed in accordance with one or more pre-defined criteria. The client device 102 may receive one or more second advertisements and outputs one or more of them in conjunction with the second content item in the rearranged content output. The client device 102 may output the second advertisements in conjunction with the second content item by inserting into breaks between segments of the second content item, inserting them into positions prior to or subsequent to the second content item, overlays them over the second content item, rescales the second content item to fit the second advertisements, and so forth.

The one or more of the second advertisements may be displayed in accordance with one or more predefined criteria. The criteria may be predefined defaults, user-set preferences, etc. The criteria may control the placement of the advertisements when output (e.g., no advertisements in the breaks, no overlay advertisements, inserting advertisements to position prior to content item is acceptable, etc.).

In some implementations, the second advertisements are related to the second content item (718). The second advertisements are related to some characteristic of the second content item. For example, the second advertisements may be related to the subject matter of the second content item. As another example, the second advertisements may have demographic targets in common with the second content item.

In some implementations, the first device outputs (722) the one or more of the second advertisements during pauses or delays in outputting the second content item. For example, the client device 102 may output the one or more of the second advertisements when the rearranged content output is paused (e.g., in accordance with user input) or delayed (e.g., for buffering and processing of the content stream 202).

In some implementations, the first device outputs (724) the one or more of the second advertisements to a second device linked with the first device. The client device 102 may be linked with a secondary device 108. The client device may transmit the second advertisements to the secondary device 108 for output on the secondary device 108. In some implementations, the secondary device 108 displays the second advertisements at the same time as the rearranged content output 206 is output to display 104. In some implementations, the second advertisements include some or all of the first advertisements.

In some implementations, the first device signals (726) the second device linked with the first device to display the one or more of the second advertisements. The client device 102 may send signals, along with the second advertisements, to the secondary device 108 to display the second advertisements. In some other implementations, the client device 102 sends signals to the secondary device 108 to retrieve one or more second advertisements from the computer system 112 and to display those advertisements.

In some implementations, the first device outputs (728) the one or more of the second advertisements alongside the second content item. The client device 102 may output the second advertisements with the second content item, so that they are displayed adjacent to each other when viewed by the end user. For example, the second content item may be rescaled to fit both the second content item and the second advertisements on the display 104.

In some implementations, removing the first advertisements from the first content item in accordance with the first advertisement information includes removing the first advertisements from the first content item in the stored first content stream (732). The client device 102 removes the first advertisements from the first content item in the content stream 202 stored at the client device 102.

In some implementations, removing the first advertisements from the first content item in accordance with the first advertisement information includes removing the first advertisements from the first content item upon playback of the first content item (734). The client device 102 may remove the first advertisements from the first content item upon playback of the first content item in the content stream 202; the client device 102 receives and buffers the content stream 202, and processes the buffered content stream 202 to remove the advertisements as the content stream 202 is played back (i.e., output to display 104).

In some implementations, the first device receives (736) a second content stream, the second content stream including a third content item and one or more third advertisements inserted in the third content item. The client device 102 may receive another content stream with another content item (e.g., a different television program) and the advertisements in the content item. The third content item and the third advertisements may be buffered or otherwise stored at the first device.

The first device receives (738) second advertisement information, where the second advertisement information indicates times at which the third advertisements are inserted in the third content item. As with the first advertisement information, the client device 102 may receive the advertisement information for the advertisements in content items in other content streams received by the client device 102.

The first device generates (740) a fourth content item by removing the third advertisements from the third content item in accordance with the second advertisement information, and output (742) the fourth content item to a display. The client device 102 may remove the advertisements from the content item in another content stream to generate a content item without the advertisements, and output that resulting content item to the display 104.

In some implementations, the first device rearranges (744) segments of the second content item with segments of the fourth content item and outputting the second and fourth content items as a rearrangement of the segments. The client device 102 may rearrange segments from multiple content items (without the advertisements) and concatenate the segments together. For example, segments from one content item may be inserted into the breaks between segments of another content item.

In some implementations, the first device receives (746) one or more fourth advertisements, and outputs (750) one or more of the fourth advertisements in conjunction with the fourth content item, where the one or more of the fourth advertisements are displayed in accordance with one or more pre-defined criteria. Analogous to steps 716 and 720, respectively, the client device 102 receives the fourth advertisements from the computer system 112, and outputs at least some of the fourth advertisements in conjunction with the fourth content item.

In some implementations, the fourth advertisements are related to the fourth content item (748). Analogous to step 718, the fourth advertisements may be related to the subject matter or other characteristic of the fourth content item.

In some implementations, the first device outputs the one or more of the fourth advertisements during pauses or delays in outputting the fourth content item (752). Analogous to step 722, the client device 102 may output the fourth advertisements when the fourth content item is paused or its outputting is delayed (e.g., due to buffering).

In some implementations, the second advertisements are displayed on the display 511 of the secondary device 108, or on the display 104. The second advertisements may be displayed when there is a pause break in the content output on the client device 102, user interaction with a programming guide on the client device 102, or output of non-linear programming on client device 102. The second advertisements may be text advertisements or advertisements with text, graphics, audio and/or video. The second advertisements may be displayed alongside other content (e.g., online or television content) or take up the entire display area. The second advertisements may be captured from content streams (e.g., television programming) or downloaded from elsewhere through the network(s) 118 (e.g., computer system 112, other content hosts). The second advertisements may be selected based on the content 207 of the content stream 202 (e.g., the television program and/or the channel being watched), characteristics of the user (e.g., demographics), and/or time spent watching the content 207. It should be appreciated that if, in the described implementations and implementations, user data is collected, the collection of data for a particular user may be subject to opt-in by the particular user. Further, the collected data for a particular user may be anonymized so that the particular user is not identifiable from the collected data.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

Reference has been made in detail to implementations, examples of which are illustrated in the accompanying drawings. In the above detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the implementations.

The foregoing description, for purpose of explanation, has been described with reference to specific implementations. The implementations were chosen and described in order to best explain the principles of the invention and its practical applications, to thereby enable others skilled in the art to best utilize the invention and various implementations with various modifications as are suited to the particular uses contemplated. However, the illustrative discussions above are not intended to be exhaustive or to limit the invention to the precise forms disclosed. Many modifications and variations are possible in view of the above teachings.

What is claimed is:

1. A method comprising:
at a first device coupled to a first display device:
receiving a content stream that includes a content item, wherein the content item includes a plurality of content segments and one or more advertisement segments interspersed within the plurality of content segments at designated points in time;
receiving an information stream, wherein the information stream includes first advertisement information, provided by an authorized source, that indicates the times at which each of the one or more advertisement segments is interspersed within the plurality of content segments;
determining that the first device is linked to a secondary device that is authorized to display advertising content and is distinct from the first display device; and
in accordance with the determination that the first device is linked to the authorized secondary device:
generating a modified content item by removing the one or more advertisement segments interspersed within the plurality of content segments in accordance with the first advertisement information and subsequently concatenating the plurality of content segments;
after generating the modified content item:
outputting the modified content item to the first display device; and
outputting the one or more removed advertisement segments, without the modified content item, for concurrent display on the secondary device while the modified content item is displayed on the first display device.

2. The method of claim 1, wherein the one or more advertisement segments are one or more first advertisement segments and the method further comprises:
receiving one or more second advertisement segments; and
outputting one or more of the second advertisement segments in conjunction with the modified content item, wherein the one or more of the second advertisement segments are displayed in accordance with one or more pre-defined criteria.

3. The method of claim 2, wherein the one or more second advertisement segments are related to the modified content item.

4. The method of claim 2, wherein outputting the one or more second advertisement segments comprises outputting the one or more second advertisement segments to the first display device during pauses or delays in outputting the modified content item.

5. The method of claim 2, wherein outputting the one or more second advertisement segments comprises outputting the one or more second advertisement segments to the secondary device.

6. The method of claim 2, wherein outputting the one or more second advertisement segments comprises outputting the one or more second advertisement segments alongside the modified content item on the first display device.

7. The method of claim 1, wherein the received first advertisement information is encrypted.

8. The method of claim 7, wherein the encrypted information restricts access of the advertisement information to client devices that meet one or more first conditions.

9. The method of claim 8, wherein the first device meets the one or more first conditions.

10. The method of claim 8, wherein the one or more first conditions are one or more of: a subscriber associated with the first device has paid for access to the first advertisement information; the first device is linked with a second device; and the first device is pre-authorized to receive and decrypt the encrypted advertisement information.

11. The method of claim 1, further comprising:
storing the received content stream.

12. The method of claim 11, wherein removing the one or more advertisement segments from the content item in accordance with the first advertisement information comprises removing the one or more advertisement segments from the content item in the stored content stream.

13. The method of claim 11, wherein removing the one or more advertisement segments from the content item in accordance with the first advertisement information comprises removing the one or more advertisement segments from the content item upon playback of the content item.

14. The method of claim 1, wherein outputting the modified content item comprises:
outputting the modified content item on a time shift with respect to the content stream.

15. The method of claim 1, wherein receiving the content stream comprises receiving the content stream in accordance with a user selection of the content item.

16. The method of claim 1, wherein the content stream is a first content stream, the content item is a first content item, the plurality of content segments is a first plurality of content segments, the one or more advertisement segments are one or more first advertisement segments, the information stream is a first information stream, the modified content item is a first modified content item, and the method further comprises:
receiving a second content stream that includes a second content item, wherein the second content item includes a second plurality of content segments and one or more second advertisement segments interspersed within the second plurality of content segments at designated points in time;
receiving a second information stream, wherein the second information stream includes second advertisement information that indicates the times at which each of the one or more second advertisement segments is interspersed within the second plurality of content segments; and
in accordance with the determination that the first device is linked to an authorized secondary device:
generating a second modified content item by removing the one or more second advertisement segments interspersed within the second plurality of content segments in accordance with the second advertisement information and subsequently concatenating the second plurality of content segments; and outputting the second modified content item to the first display device.

17. The method of claim 16, wherein outputting the second modified content item comprises rearranging segments of the first modified content item with segments of the second modified content item and outputting the first and second modified content items as an rearrangement of the segments.

18. The method of claim 16, further comprising:

receiving one or more third advertisement segments; and outputting one or more of the third advertisement segments in conjunction with the second modified content item, wherein the one or more of the third advertisement segments are displayed in accordance with one or more pre-defined criteria.

19. The method of claim 18, wherein the third advertisement segments are related to the second modified content item.

20. The method of claim 18, wherein outputting the one or more of the third advertisement segments comprises outputting the one or more of the third advertisement segments to the first display device during pauses or delays in outputting the second modified content item.

21. A system, comprising:

one or more processing units;

memory storing one or more programs configured for execution by the one or more processing units; and a first display device;

the one or more programs comprising instructions for:

receiving a first content stream that includes a first content item, wherein the first content item includes a first plurality of content segments and one or more first advertisement segments interspersed within the first plurality of content segments at designated points in time;

receiving a first information stream, wherein the first information stream includes first advertisement information, provided by an authorized source, that indicates the times at which each of the one or more first advertisement segments is interspersed within the first plurality of content segments;

determining that the system is linked to a secondary device that is authorized to display advertising content and is distinct from the first display device; and in accordance with the determination that the first device is linked to the authorized secondary device:

generating a first modified content item by removing the one or more first advertisement segments interspersed within the first plurality of content segments in accordance with the first advertisement information and subsequently concatenating the first plurality of content segments;

after generating the first modified content item:

outputting the first modified content item to the first display device; and outputting the one or more removed first advertisement segments, without the first modified content item, for concurrent display on the secondary device while the first modified content item is displayed on the first display device.

22. The system of claim 21, further comprising instructions for:

receiving a second content stream that includes a second content item, wherein the second content item includes a second plurality of content segments and one or more second advertisement segments interspersed within the second plurality of content segments at designated points in time;

receiving a second information stream, wherein the second information stream includes second advertisement information that indicates the times at which each of the one or more second advertisement segments is interspersed within the second plurality of content segments;

in accordance with the determination that the first device is linked to an authorized secondary device:

generating a second modified content item by removing the one or more second advertisement segments from the second content item in accordance with the second advertisement information; and outputting the second modified content item to the first display device.

23. The system of claim 22, wherein outputting the second modified content item comprises rearranging segments of the second content item with segments of the second modified content item and outputting the two content items as a rearrangement of the segments.

24. A non-transitory computer readable storage medium storing one or more programs configured for execution by a first device coupled to a first display device, the one or more programs comprising instructions for:

receiving a first content stream that includes a first content item, wherein the first content item includes a first plurality of content segments and one or more first advertisement segments interspersed within the first plurality of content segments at designated points in time;

receiving a first information stream, wherein the first information stream includes first advertisement information, provided by an authorized source, that indicates the times at which each of the one or more first advertisement segments is interspersed within the first plurality of content segments;

determining that the first device is linked to a secondary device that is authorized to display advertising content and is distinct from the first display device; and in accordance with the determination that the first device is linked to the authorized secondary device:

generating a first modified content item by removing the one or more first advertisement segments interspersed within the first plurality of content segments in accordance with the first advertisement information and subsequently concatenating the first plurality of content segments;

after generating the first modified content item:

outputting the first modified content item to the first display device; and outputting the one or more removed first advertisement segments, without the first modified content item, for concurrent display on the secondary device while the first modified content item is displayed on the first display device.

25. The non-transitory computer readable storage medium of claim 24, further comprising instructions for:

receiving a second content stream that includes a second content item, wherein the second content item includes a second plurality of content segments and one or more second advertisement segments interspersed within the second plurality of content segments at designated points in time;

receiving a second information stream, wherein the second information stream includes second advertisement information that indicates the times at which each of the one or more second advertisement segments is interspersed within the second plurality of content segments; and in accordance with the determination that the first device is linked to an authorized secondary device:
  generating a second modified content item by removing the one or more second advertisement segments from the second content item in accordance with the second advertisement information; and
  outputting the second modified content item to the first display device.

26. The non-transitory computer readable storage medium of claim 25, wherein outputting the second modified content item comprises rearranging segments of the second content item with segments of the second modified content item and outputting the two content items as a rearrangement of the segments.

\* \* \* \* \*